United States Patent [19]

Krofta

[11] 4,022,696

[45] May 10, 1977

[54] APPARATUS FOR CLARIFICATION OF WASTE WATER OPERATING ON DISSOLVED AIR FLOTATION PROCESS

[76] Inventor: Milos Krofta, 58 Yokun Ave., Lenox, Mass. 01240

[22] Filed: Mar. 24, 1976

[21] Appl. No.: 670,067

[52] U.S. Cl. .............................. 210/520; 210/525; 210/530; 210/532 R; 210/540

[51] Int. Cl.² ......................................... B01D 17/08

[58] Field of Search ........ 210/520, 521, 528, 530, 210/532 R, 532 S, 525, 538, 540, 70, 83; 209/168, 170, 173, 155, 211

[56] References Cited

UNITED STATES PATENTS

| | | | |
|---|---|---|---|
| 2,874,842 | 2/1959 | Krofta | 210/540 X |
| 3,067,878 | 12/1962 | Geinter et al. | 210/521 X |
| 3,182,799 | 5/1965 | Krofta | 210/521 X |
| 3,307,701 | 3/1967 | Krofta | 210/497 X |
| 3,452,869 | 7/1969 | O'Neill | 210/520 X |
| 3,552,571 | 1/1971 | Neuspiel et al. | 210/520 X |

*Primary Examiner*—Bernard Nozick
*Assistant Examiner*—William A. Cuchlinski, Jr.
*Attorney, Agent, or Firm*—Edward T. Connors

[57] ABSTRACT

Apparatus for clarifying waste water is disclosed in which the waste water being treated is moved through the apparatus with minimum turbulence so that the flotation rate of suspended particles is brought closely to a theoretical value. The apparatus includes a flotation tank unique in that its height is low compared to its area. Inlet pipes for waste water are supported by a carriage which moves around the flotation tank supported on the outer edge of the tank and a runway towards the center thereof. The clarified water is removed by pipes also supported by the carriage and so supported that advantage is taken of the movement of the carriage to effect a longer flotation path for the rising particles.

15 Claims, 7 Drawing Figures

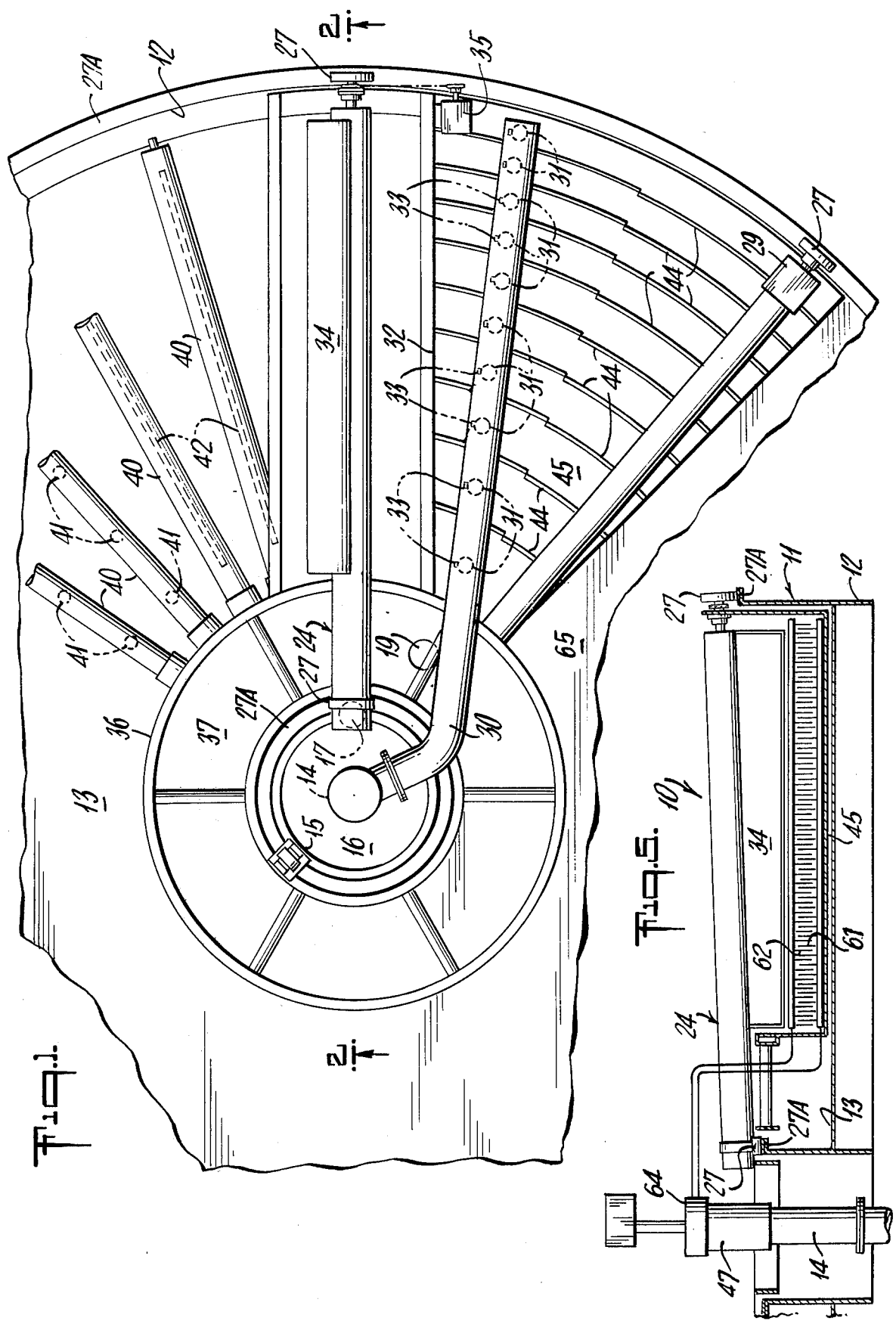

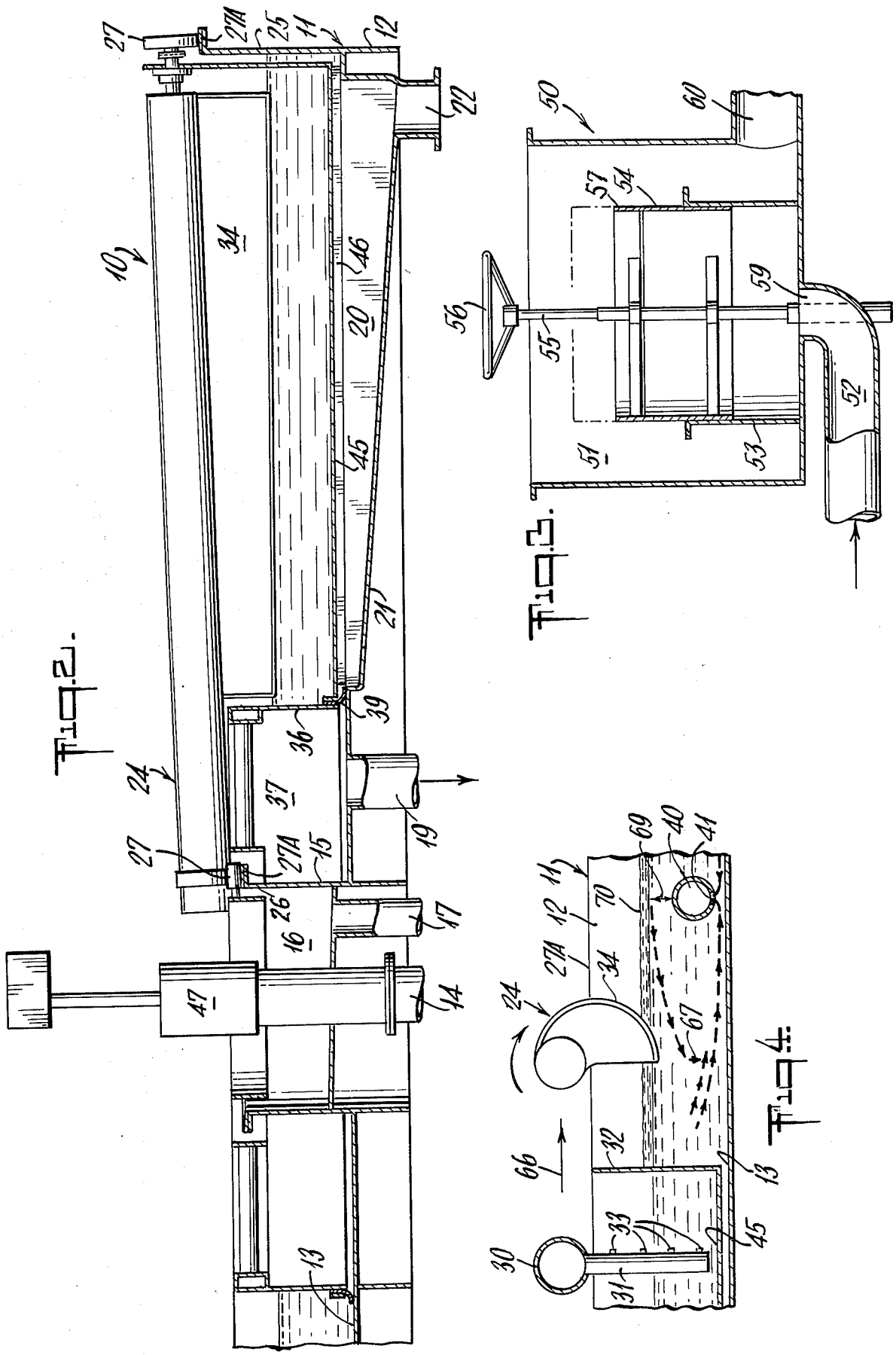

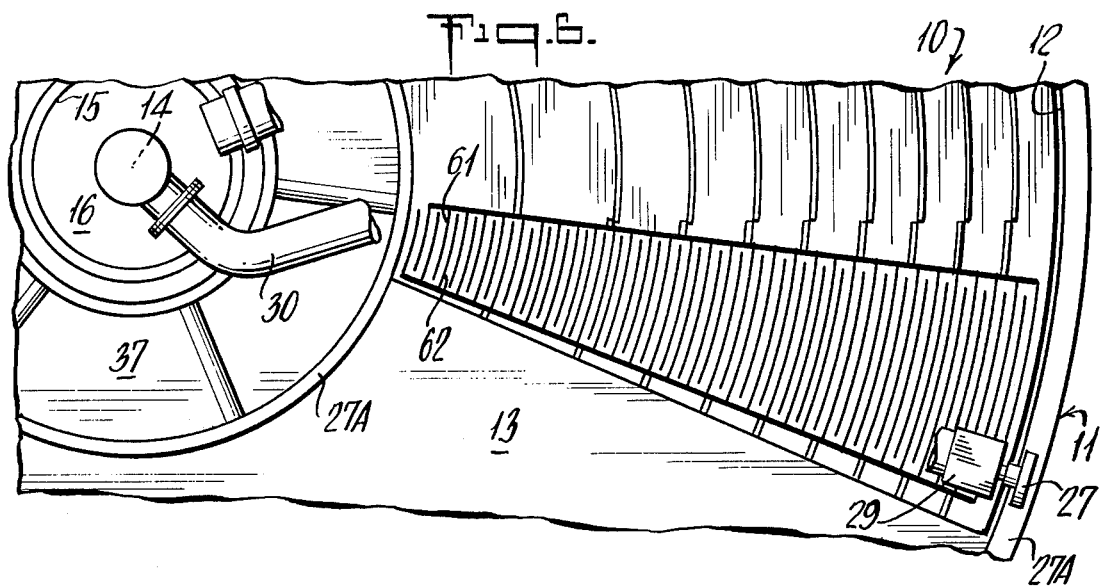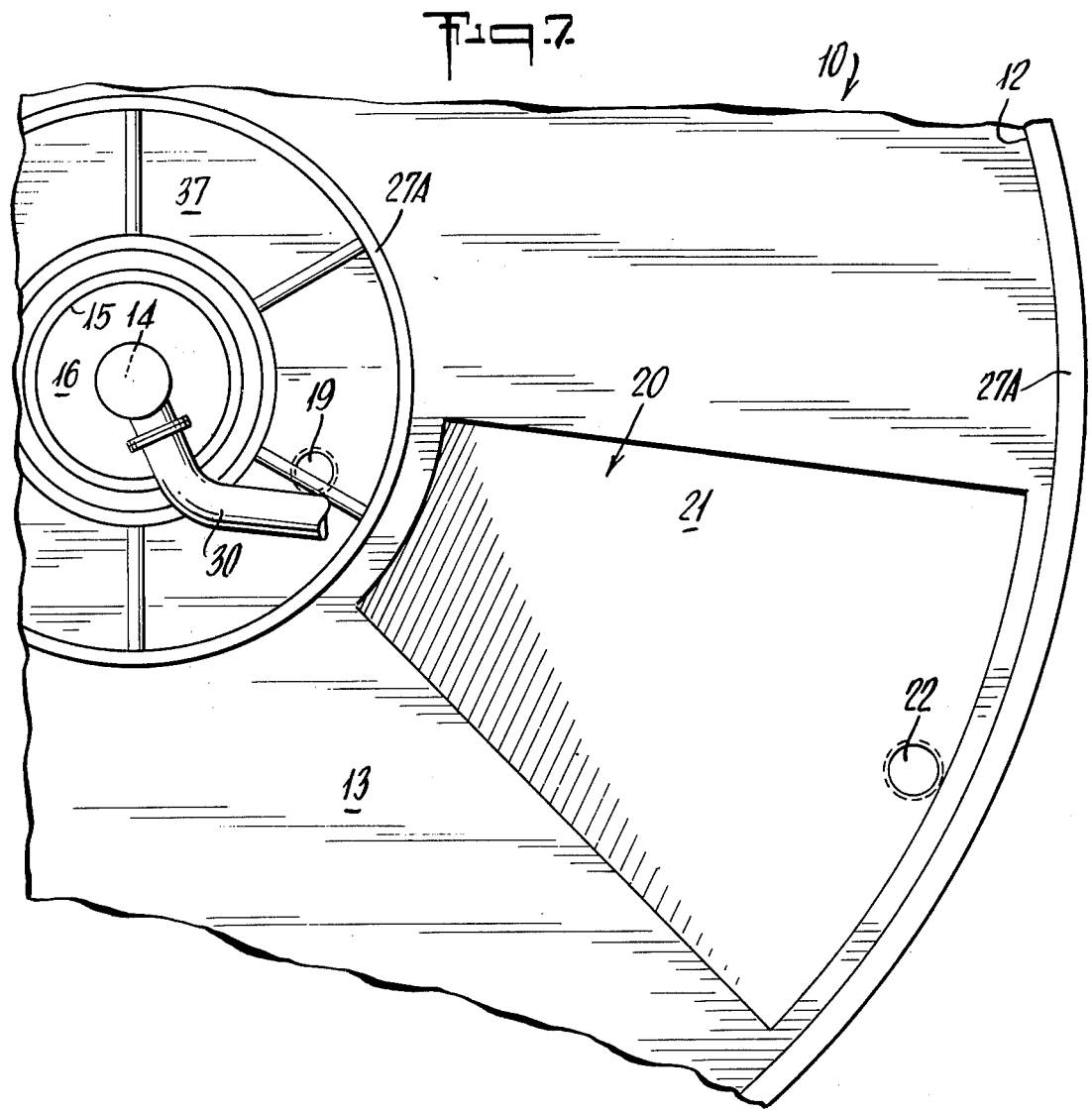

APPARATUS FOR CLARIFICATION OF WASTE WATER OPERATING ON DISSOLVED AIR FLOTATION PROCESS

BACKGROUND OF THE INVENTION

This invention relates to an apparatus for clarifying the unclarified waste water in the paper, pulp, and like industries, wherein the recovery of solids is effected principally by flotation. The unclarified waste water generally is pretreated with flocculation chemicals and a gas such as air is introduced into the waste water prior to the clarification treatment.

DESCRIPTION OF THE PRIOR ART

It is known in the waste water clarification art to dissolve a few percent of air by volume into the waste water in which the water is under a pressure of between thirty and one hundred pounds per square inch. As the water is released into a flotation tank microscopic air bubbles emerge and attach themselves to particles suspended in the water so as to float the particles to the surface. The waste water may be treated with flocculating chemicals so that the particles are flocculated. The use of the flocculating chemicals and the dissolved air results in a rapid flotation rate and a more complete separation of the suspended particles from the waste water.

Prior apparatus for waste liquid purification is described in U.S. Pat. No. 2, 874, 842 issued Feb. 24, 1959 to Milos Krofta, the applicant herein. This patent discloses a construction operative without the use of mechanical skimmers in which the waste water is treated with a gas so that bubbles rising through the liquid entrain particles. An inclined surface is provided along which passes the liquid undergoing purification.

Another apparatus for waste water clarification is shown in U.S. Pat. No. 3, 182, 799 issued May 11, 1965 also to Milos Krofta, the applicant herein. This patent also discloses a construction operative without the use of mechanical skimmers in which the waste water is also treated with a gas and divided into a plurality of narrow paths by baffle means obliquely positioned so that the total surface available for clarifying action is considerably increased.

Apparatus for waste water treatment utilizing mechanical skimmers is shown in U.S. Pat. No. 3, 307, 701 issued March 7, 1967, also to Milos Krofta, the applicant herein. This patent discloses an improved spirally curved skimmer plate engaging the upper portion of a body of waste water so as to scoop off floated waste material. This structure is incorporated with a cylindrical housing in the central portion of which are positioned a plurality of dispensing nozzles to discharge into a body of waste water, the dispensing nozzles utilizing a velocity reducing structure so as to minimize turbulence from the discharge into the body of waste water.

Still another apparatus for separating solids from a fluid mixture is shown in U.S. Pat. No. 3,452,869 issued July 1, 1969 to Raymond J. O'Neil. This patent is particularly directed to a settling tank system rather than to a flotation tank system as is the case of the present application. However, as skimmer means is incorporated to remove floatables and a rotatable carriage structure is utilized this patent is important to illustrate the development of the art leading to the present disclosure.

The devices disclosed in the prior patents have been generally satisfactory in that the Krofta constructions without skimmers are effective in clarifying the waste water, the construction of Krofta Patent, U.S. Pat. No. 2,874,842 providing a retention time of about 20 minutes and being suitable for outside use. The construction of Krofta Patent U.S. Pat. No. 3,182,799 occupies minimum space and provides a retention time of about 8 minutes. However, in both of these constructions the sludge inherently contains more water, the additional water in the sludge being required to provide the necessary mobility thereof.

The constructions of Krofta U.S. Pat. No. 3,307,701 and O'Neil's U.S. Pat. No. 3,452,869 both utilize skimmers thus providing a sludge with decreased water content. However the Krofta construction requires a rather deep tank while the O'Neil construction for removing clarified water results in an inefficient operation.

Waste water may be clarified either by sedimentation or by flotation of the suspended particles therein. Theoretically it has been found that the sedimentation velocity of particles is approximately at the rate of one inch per minute, resulting in a clarification rate of 0.5 gallon per minute per square foot of sedimentation area. Clarifiers operating on the sedimentation principle operate close to 100 percent of the theoretical possible clarification — but at the 0.5 gallon per minute per square foot rate.

Theoretically a system operating on the flotation principle using properly dissolved air and flocculating chemicals would obtain a rising velocity of approximately 12 inches per minute, resulting in a clarification rate of 7.5 gallons per minute per square foot of flotation area. However, commercial clarifiers operating on this principle generally clarify only at an average rate of 2.0 gallons per minute per square foot of flotation area, or at only about one quarter of the theoretical rate. It should be quite obvious that a system using the flotation principle is desireable for use because of the higher separation velocity resulting in smaller tank area and volume being required for clarification of the same amount of water.

SUMMARY OF THE INVENTION

The present invention aims to overcome the difficulties and disadvantages of prior constructions by providing an improved apparatus for clarifying waste water which is specifically directed to utilizing the flotation principle.

In accordance with the invention there is provided an improved apparatus for clarifying waste water in which a minimum amount of turbulence is caused in the water being clarified thus effective results are achieved in a simple and compact structure. The retention time for liquids processed according to the invention is of the order of two to three minutes and the clarification load is improved to 4 to 6 gallons per minute per square foot of area. These results are accomplished using tanks in which the depth of water being treated is only about one third of the depth of conventional systems. Further, turbulence is reduced by an improved structure for bringing the waste water into the flotation tank and for removal of the floated sludge and clarified water.

The carriage carries both inlet pipes for the waste water and outlet pipes for clarified water. The carriage is carried by the upper edge of the flotation tank and central supporting means.

The apparatus used to process the waste water includes the flotation tank and means to supply the water to be clarified. Suitable means is used to entrain flocculation agents and air into the water before it is released into the tank. A slowly moving skimmer supported by the carriage removes floated solids from clarified water, both the solids and the clarified water being separately discharged from the apparatus. The arrangement of the structure of the carriage is such that an effective longer flotation path for rising particles is provided.

The apparatus in accordance with the invention is directed towards use of the flotation process rather than towards the less efficient sedimentation process. The apparatus includes features such as: an inlet with a pressure rotary joint that allows higher inlet capacity; verticle distribution pipes with jets directed towards a dividing wall providing pressure reduction with minimum turbulence; baffle walls for the jets spaced proportionately to the diameter of the tank for uniform outlet for each jet; a sump for collecting coarse dirt adapted for periodic purging; a scraper provided on the moving carriage to scrape debris into the sump; a bottom baffle plate shields the sump against turbulence, means for removing clarified water uses slotted or perforated pipes supported by the carriage; means is provided whereby clarified water is discharged into a centrally positioned compartment connected to a separate overflow; and means whereby floated sludge is also discharged into a central compartment.

Other objects and advantages of the invention will be apparent from the following description and from the accompanying drawings which show, by way of example, an embodiment of the invention.

BRIEF DESCRIPTION OF THE DRAWINGS

FIG. 1 is a fragmentary top view of apparatus in accordance with the invention.

FIG. 2 is a side view corresponding to FIG. 1.

FIG. 3 is an elevational view of a control valve for maintaining a desired water level in the apparatus.

FIG. 4 is a partial sectional view illustrating the path of the clarified water prior to removal from the flotation tank.

FIG. 5 is a partial view at a reduced scale corresponding to FIG. 2 but illustrating the electrodes.

FIG. 6 is a top view corresponding to FIG. 1 and illustrating the electrodes.

FIG. 7 is a top view corresponding to FIG. 1 and illustrating the baffle plate without the baffle members.

DESCRIPTION OF THE PREFERRED EMBODIMENT

Referring to the drawings there is shown in FIGS. 1 and 2 apparatus 10 for purifying unclarified waste water in the paper, pulp, and like industries in which solids are removed by means of air flotation and sedimentation, approximately 90% of the solids being removed by flotation. The apparatus 10 includes a cylindrically shaped tank 11 having an upwardly directed wall 12 and a generally flat bottom 13. An inlet pipe 14 extends vertically through the center portion of the tank. An upwardly directed circular wall 15 defines a sludge or floated solids compartment 16 positioned about said inlet pipe 14. An outlet pipe 17 is provided in the bottom of the sludge compartment 16. An outlet 19 for clarified water is formed in the bottom of the tank outwardly of the sludge compartment 16. A radially extending sludge trough 20 for sediment is formed in the bottom 13 of the tank 12 and formed with an inclined bottom surface 21 to direct sludge towards an outlet 22.

A carriage 24 is supported radially of the tank 11 between upper edge 25 of the tank wall 12 and upper edge 26 of wall 15 by means of rotatable bearing members or wheels 27 riding on corresponding bearing surfaces 27A which may be in the form of flanges at the top edges of the walls. Motor means 29 is provided for rotatable movement of the carriage 24 around the tank 11.

A waste water distribution arm 30 is supported by the carriage 24 and provided with a plurality of downwardly depending water outlet pipes 31 having apertures 33 directed towards a dividing wall 32. A sludge removing scoop 34 is supported by the carriage 24 ahead of the dividing wall 32 and rotated by motor 35. In an alternative construction the carriage 24 and the scoop 34 may be driven by the same motor utilizing suitable connecting means. The scoop 34 is preferable as shown and described in Krofta U.S. Pat. No. 3,307,701.

A generally circular wall 36 defining a clarified water inlet distributor is carried by the distribution arm 30 for support by the carriage 24 and provides a clarified water storage area 37 outwardly of the sludge compartment 16. Means such as a rubber seal 39 positioned at the lower edge of the circular wall 36 seals off the clarified water compartment 37 during the rotation of the carriage 24.

A plurality of water inlet pipes 40 lead into the lower portion of the water inlet distributor 36, the pipes being positioned between 15° and 90° ahead of the dividing wall 32. Perforations or aperatures 41 or a slot 42 may be formed on the bottom surfaces of the clarified water inlet pipes 40, the lower surfaces of the pipes 40 being spaced preferably between 1 and 2 inches from the tank bottom 13.

Vertical extending baffle members 44 are positioned between the inlet pipes 31 and spaced from each other proportionately with a wider space between the baffles located towards the center portion of the tank, the spaces decreasing towards the more outwardly positioned pipes so that minimum turbulence is provided by the discharge from the water outlet pipes 31. A horizontally extending bottom baffle plate 45 (FIGS. 1 and 7) extends beneath, and is connected to, the vertically extending baffle members 44, and to the dividing wall 32, the baffle plate 45 having an angular area at least as great as the corresponding angular opening of the sediment trough 20. A scraper 46 is attached to the bottom plate 45 to sweep sediment from the bottom of the tank 13 into the sediment trough 20. The waste water distribution arm 30 is connected to the inlet 14 by a rotatable pressure joint 47.

In FIG. 3 there is shown a control valve 50 connected by a pipe 52 to the clarified water outlet 19 to maintain the desired level of water in the tank 11 by providing back pressure therein. The control valve 50 includes a tank 51 having an inner circular tank wall 53 within which is positioned a slideable tank wall 54 moved upwardly and downwardly by a rod 55 actuated by the wheel 56. The level of the top edge 57 of the slideable tank wall 54 determines the level of the waste water in the tank 11. Inlet means 59 and outlet means 60 may be provided in the lower portion of the control valve 50.

The apparatus may be provided with means for electrolysis of the water such as by submerged electrodes 61 and 62 (FIG. 5) carried by the bottom baffle plate 45, alternate plates being insulated and connected through a slip ring 64 to a suitable supply of direct current in the range of 5 to 25 volts.

In the operation of the apparatus in accordance with the invention waste water containing a maximum of 1,500 parts per million of solids is entered into the inlet 14. Higher concentrations of solids require recycling of clarified water into the inlet to dilute any heavier concentration as too heavy a concentration of solids will not permit efficient operation. The tank 11 is filled with water up to a depth of 16 – 18 inches, the water entering the tank from the inlet pipe 14 through the rotary pressure joint 47, the distribution arm 30, the downwardly depending pipes 31, and exits through the orifices 33 into the expansion space provided by the dividing wall 32, the vertically extending baffles 44, and the bottom plate 45, so that a practically turbulent free discharge is provided in the area 65.

Prior to entry into the inlet pipes 40, the waste water may be treated with flocculating chemicals and by the injection of air as is known in the art. As the water with air and chemicals dissolved exits through the orifices 33 expansion takes place and microscopic air bubbles are produced which attach themselves to suspended particles in the waste water and tend to float solid particles to the surface, the theoretical rate of flotation being of the order of 12 inches per minute. The carriage 24 is rotated at the rate of 1 revolution in 2 to 3 minutes, so that in the event the water is 16 inches deep, the majority of the suspended particles are floated towards the surface by the time a revolution of the carriage has taken place.

By the combined action of the microscopic bubbles and the floculating chemicals a flotable sludge appears on the surface. This sludge is scooped off by the rotating scoop 34 and discharged into the sludge compartment 16 where it may be discharged through the bottom discharge pipe 17. Simultaneously, clarified water is taken from the lower portion of the tank by gravity entering through the perforations 41 or the slots 42 on the underside of the clarified water pipes 40. This clarified water enters the clarified water compartment 37 where it may be discharged through its outlet 19 through the control valve 50 and outwardly through outlet 60.

As may be seen in FIG. 4 it should be noted that through the operation of the scoop 34, and because of the rotational movement of the carriage 24 in the direction from left to right as indicated by the arrow 66, the waste water takes the path generally indicated at 67 by dashed arrows. Thus there is an effective greater time for the movement of the water in the longer path 67 than would be normally expected, because the path 67 is longer than the vertical distance 69 from the pipe 40 to the bottom of the sludge area generally indicated at 70. By reason of this increased time, and because the clarified water is led in from an area 1 to 2 inches above the bottom 13 of the tank 11, it has been found that the water entering the inlet is clarified more than would have been expected considering the depth of the water and the time of rotation of the carriage.

It will be noted in observing the air flotation of solids in waste water in a clear container, that in the lower portion of the container the bubbles are small and the suspended solids are hardly visible. As the bubbles of dissolved air rise through the waste water, they increase in size and the concentration of the solids is visibly greater, the action of the flocculating chemicals taking place and causing the formation of flocks considerably larger in the direction towards the surface of the water. It is believed that the positioning of the inlet pipes 40 for the clarified water with openings 41 or 42 directed towards the bottom of the tank 11, by the position of the dividing wall 32, by the removal of the sludge by the scoop 34, the longer path 67 of the water particles results in the greater effectiveness of the clarifying apparatus of this invention. In any event applicant has found that his apparatus provides results with a small lightweight tank, and a small body of water, to be about twice as effective as the results obtained with known conventional apparatus.

Improvement of the flotation may be achieved by electric flotation wherein microscopic bubbles are created in the water by electrolysis produced by current flow between the electrodes 61 and 62 (FIGS. 5 and 6). In comparison to the bubbles formed by the dissolved air in the water the bubbles produced by electrolysis are smaller in size. Further, electroflotation or electrolysis produces on the anodes oxygen and chlorine if chlorides are present in the water either inherently or by preaddition. The oxygen and chlorine disinfect the water, kill bacteria, and oxidize colloidal dispersed impurities. If desired, electroflotation can substitute for the use of dissolved air, provided the water has adequate conductivity and sufficient current is applied. In some instances electro-flotation may result in a less costly operation than that by the use of chemicals, and in some cases, higher clarification is achieved.

In commercial embodiments of the invention, apparatus is provided with tanks of various sizes in diameters ranging from 8 to 44 feet. The depth of the waste water in the tanks is generally from 16 to 18 inches. Such tanks are suitable for treating from 148 gallons per minute to 4,500 gallons per minute. The outflow purity of the clarified water ranges from 10 to 100 parts per million. The horsepower required for the operation of the apparatus is of the order of 0.57 kilowatt hours per 1,000 gallons. The retention time of the water in the tanks is of the order of 2½ minutes. The weight of the apparatus is of the order of 100 pounds per square foot and the specific clarification load is of the order of 4 to 6 gallons per minute per square foot of area. The liquid received contains a maximum of 1,500 parts per million of impurities. As stated before, higher concentrations of impurities require recycling of clarified water to dilute the incoming water.

It is apparent from the preceding description that an improved apparatus has been provided for the clarification of waste water in the paper, pulp, and like industries.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

I claim:

1. Apparatus for purifying unclarified water in the paper, pulp, and like industries comprising
a cylindrically shaped tank having an upwardly directed outer wall and a generally flat bottom,
an inlet pipe extending vertically through the center portion of said tank, a cylindrically shaped sludge compartment positioned about said inlet pipe in the center portion of said tank and having an upwardly directed outer wall, an outlet pipe for said sludge compartment, an outlet pipe for clarified water in said tank positioned outwardly of said sludge compartment, means defining a sludge trough in the bottom of said tank, outlet means for said sludge trough, a carriage supported radially of said tank between the upper edge of said tank wall and the upper edge of said sludge compartment wall for rotatable movement around the inside of said tank, means for rotatable movement of said carriage, a waste water distribution arm carried by said carriage radially of said tank and provided with a plurality of orifices, sludge removal scooping means extending radially of said tank and carried by said carriage, means for operation of said sludge removal scooping means, and a clarified water inlet distributor carried by said carriage and having a cylindrical wall spaced outwardly of said sludge compartment in fluid communication with said clarified water outlet pipe.

2. Apparatus according to claim 1 in which at least one clarified water inlet pipe extends radially from said clarified water distributor.

3. Apparatus according to claim 2 in which said clarified water inlet pipe is positioned on the leading edge of said carriage spaced between 15° and 90° ahead of said distribution arm.

4. Apparatus according to claim 2 in which said clarified water inlet pipe is apertured on the bottom side thereof.

5. Apparatus according to claim 2 in which said clarified water inlet is positioned approximately in the lower ten percent of the height of said tank.

6. Apparatus according to claim 1 in which a bottom scraper is provided and supported by said carriage to sweep sediment into said sludge trough.

7. Apparatus according to claim 1 in which said means for rotatable movement of said carriage includes means for operating said sludge removal scooping means.

8. Apparatus according to claim 1 in which electrodes are provided and supported by said carriage for rotation therewith.

9. Apparatus according to claim 1 in which a plurality of generally vertically extending baffle members are provided supported by said carriage for diffusing the discharge of said orifices.

10. Apparatus according to claim 1 in which a horizontally extending bottom baffle plate is provided supported by said carriage for diffusing the discharge of said orifices.

11. Apparatus according to claim 1 in which sealing means is positioned between the lower edge of said clarified water distributor wall and the bottom of said tank.

12. Apparatus according to claim 1 in which the height of said tank is of the order of less than twenty percent of the diameter thereof.

13. Apparatus according to claim 1 in which a rotatable pressure joint connects said inlet pipe and said distribution arm.

14. Apparatus according to claim 1 in which said means for rotating said carriage rotates said carriage between two and ten revolutions per minute.

15. Apparatus according to claim 1 in which adjustable level means is provided to maintain a desired fluid level in said tank.

* * * * *